Figure 1:
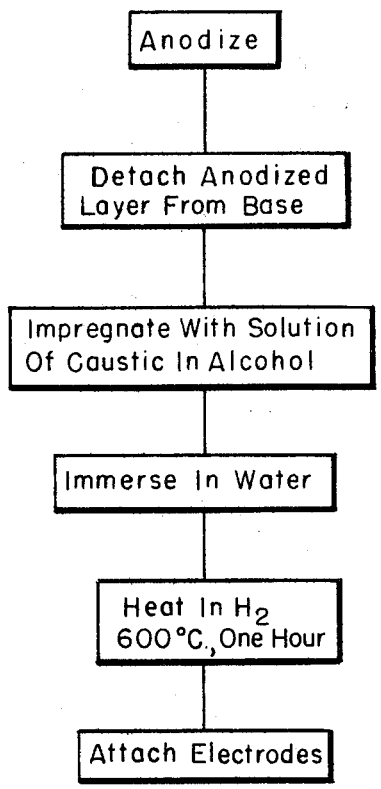

United States Patent
Wainer et al.

[11] 3,724,066
[45] Apr. 3, 1973

[54] LIGHT AMPLIFIERS

[75] Inventors: Eugene Wainer, Shaker Heights; Selwyn H. Rose, Beachwood; Theodore M. Harkulich, Chagrin Falls, all of Ohio

[73] Assignee: Horizons Incorporated, a Division of Horizons Research Incorporated of Ohio, Cleveland, Ohio

[22] Filed: July 19, 1971

[21] Appl. No.: 165,827

Related U.S. Application Data

[62] Division of Ser. No. 764,370, Sept. 20, 1968, Pat. No. 3,626,233.

[52] U.S. Cl. .................29/592, 29/25.18, 156/2, 313/103
[51] Int. Cl. .................................B23p 17/04
[58] Field of Search ....313/103, 104, 105; 29/25.17, 29/25.18, 592; 156/2, 3, 7

[56] References Cited

UNITED STATES PATENTS

| 3,634,712 | 1/1972 | Orthuber | 313/105 X |
| 3,461,332 | 8/1969 | Sheldon | 313/105 X |
| 3,534,207 | 10/1970 | Blamoutier et al. | 313/104 X |

OTHER PUBLICATIONS

Goodrich et al., "Continuous Channel Electron Multiplier" Rev. Sci. Instr. 33, (1962) pages 761–762

Primary Examiner—Charles W. Lanham
Assistant Examiner—J. W. Davie
Attorney—Lawrence I. Field

[57] ABSTRACT

Microchannel plates prepared from anodized aluminum layers etched to increase the pore volume to approximately 50 percent and then treated to exhibit suitable electrical properties for use as a channel plate.

11 Claims, 3 Drawing Figures

3,724,066

(Anodized Plate)

(Holes Enlarged)

LIGHT AMPLIFIERS

This is a division, of application Ser. No. 764,370, filed Sept. 20, 1968, now U.S. Pat. No. 3,626,233.

This invention relates to a channel plate and to the method by which said plate is prepared.

As is known in the art, an electron multiplying channel plate is a device having a number of parallel straight sided passages extending completely through the thickness of the plate whereby incident electrons which enter the channels increase in number during the traversal of the channel through the creation of secondary electrons arising from wall collisions. An electrical potential must, of course, be applied across the plate in order to provide an electron drift velocity down the channel and the accelerate the electrons to energies over the first crossover potential. The operation of this structure is described in detail in the Rev. Sci. Instr., 33, 761 (1962). In addition to the requirement that the passages be straight and parallel to one another, another requirement is that the hole area be at least 20 percent of the surface area of said plate and that the ratio of length to channel diameter be in the range 30–150:1.

The present invention is directed to the preparation of such plates by a novel technique in which the pores formed in an anodized surface are controllably processed to yield microchannel plates with the desired geometries. The anodizing of aluminum results in porous coatings in which the pore diameters are reasonably uniform, with the pores extending through the entire surface. The films generally run from a few microns to several mils in thickness. Similar films may be produced by the anodization of titanium, zirconium or tantalum. However, the technology of aluminum anodization is considerably more advanced and hence the present invention will be described with specific reference to aluminum although it is applicable to other metals.

Techniques for anodizing aluminum and aluminum base alloys are well known and are described, for example, in an article appearing in the Journal of the Electrochemical Society, 100, No. 9, 441 Sept. 1953) et seq. and in other publications in the same journal. As described in that article, it is also possible to detach the oxide layer from the aluminum base by an amalgamation technique. The article also describes how various pore sizes are produced in the oxide coating.

Another recent article in the same Journal, Vol. 115, page 618 et seq. describes the cross section of such a detached anodic film. As described in the literature, in order to produce an anodized coating, having the desired perpendicular pores, pure aluminum is made the anode of an acid bath which may be phosphoric, sulfuric, oxalic or sulfamic acid. A solid barrier layer of aluminum oxide is first produced on the surface of the aluminum which grows in accordance with the voltage imposed at the rate of 11 to 14A per volt applied.

The pore diameters are determined by the electrolyte used and the temperature of operation. Up to about 140 volts the pore-to-pore spacing appears to be determined by the voltage used and increases approximately 20A per volt as reported in the 1953 publication. The thickness of the coating produced is a function of temperature, voltage, current density and concentration for a given electrolyte. The thickness increases with increasing current density, voltage and electrolyte concentration and decreases with temperature. An additional variable is the purity of the aluminum with the coating characteristics varying when alloys are used. Thus it is possible to produce porous films to exact structural specifications by rigid control of the operating conditions.

The present invention includes removing, mounting, and modifying these $Al_2O_3$ films to produce channel structures having the geometry required of channel plates. Specifically channel plates have been fabricated using such films after they have been processed to give center-to-center pore spacings of about 0.8 micron, 50 percent open area, and length-to-diameter ratios of about 80 to 1. Such plates have a theoretical resolution exceeding 500 line-pairs/mm.

Figure 2:
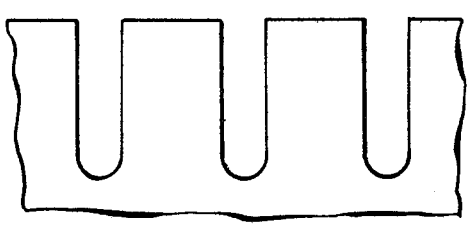
Figure 3:
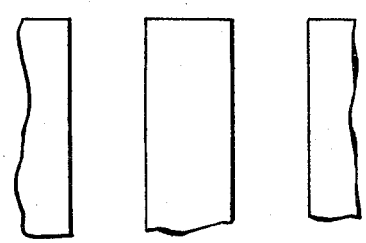

Briefly, the process of the present invention comprises the stops shown schematically in the drawing accompanying this application, FIG. 1 being in the nature of a flow sheet;

and FIGS. 2 and 3 being schematic fragmentary sections through the channel plate, illustrating the plate configuration of two different stages of its manufacture.

The manufacturing process begins with commercially available aluminum foil or sheet of any analyses, alloy 1100 (99 percent + Al) or alloy 5052 being two alloys which have been used.

Alcoa aluminum foil 5 mil thick 1100 grade 99% Al, was anodized using aqueous oxalic acid in concentrations ranging from 0.05 percent to 3 percent. The lower concentrations have higher electrical resistivity and thus provided for the use of higher applied voltages. The minimum electrode separation used was 6.5" since any closer distance reduced the effectiveness of the agitation and cooling. Using maximum (12") electrode separation and a 0.05 to 0.1 percent acid bath, voltages as high as 350 volts were used. Current densities between 15 and 150 amp/ft$^2$ were used. This was accomplished by regulating the area of the aluminum sheet which also effected an increase in voltage. In each case a heavy gauge sheet of stainless steel was used as the cathode.

Through use of high voltages, high current densities, low bath temperatures, and extremely good agitation, thick films with increased center-to-center spacings were prepared, as compared with those in the prior art.

Table I summarizes the anodizing conditions for producing films with thicknesses of from 10 to 60 microns.

The general appearance of the films was excellent. Examination under the microscope showed them to be clean, crack and hole free, and uniform in nature. The thin films (~10 microns)

TABLE I

ANODIZING CONDITIONS

| Run | Bath Time (min.) | Temp. (°C) | Oxalic Acid Conc. Wt.% | Voltage D-C | Current Density amps/ft.$^2$ | Film Thickness microns |
|---|---|---|---|---|---|---|
| 1 | 60 | 22 | 3 | 60 | 15 | 10 |
| 2 | 70 | 22 | 3 | 75 | 26 | 20 |
| 3 | 51 | 22 | 3 | 65 | 32.7 | 15 |
| 4 | 20 | 22 | 3 | 65 | 32 | 14.5 |
| 5 | 60 | 22 | 3 | 90 | 67 | 60 |
| 6 | 60 | 4 | 3 | 100 | 28 | 30 |
| (1)7 | 90 | 4 | 3 | 105 | 27.5 | 20 |

| | | | | | |
|---|---|---|---|---|---|
| 8 | 60 | 12 | 3 | 130 | 57 | 50 |
| 9 | 60 | 20 | 3 | 65 | 20 | 28 |
| 10 | 68 | 21 | 3 | 55 | 11.5 | 18 |
| 11 | 60 | 21 | 3 | 80 | 27.5 | 38 |
| 12 | 60 | 22 | 3 | 75 | 44 | 45 |
| 13 | 45 | 22 | 3 | 75 | 72 | 33 |
| 14 | 60 | 23 | 3 | 112 | 56 | 48 |
| 15 | 60 | 22 | 3 | 125 | 28.5 | 16 |
| 16 | 90 | 22 | 3 | 90 | 28 | 41 |
| 17 | 45 | 15 | 3 | 80 | 28 | 36 |
| 18 | 10 | 15 | 1.5 | 135 | 81 | 30 |
| 19 | 10 | 13 | 1.5 | 135 | 78 | 28 |
| 20 | 80 | 14 | 1.5 | 136 | 27 | 41 |
| 21 | 75 | 15 | 1.5 | 148 | 37.5 | 44 |
| 22 | 70 | 15 | 1.5 | 125 | 28 | 50 |
| 23 | 45 | 12 | 1 | 198 | 24 | 42.5 |
| 24 | 20 | 15 | 1 | 124 | 28 | 17.5 |
| 25 | 45 | 12 | 1 | 140 | 25 | 25 |
| (2)26 | 74 | 12 | 1 | 118 | 28 | |
| 27 | 60 | 15 | 1 | 115 | 28.5 | 30 |
| 28 | 58 | 13 | 1 | 158 | 37.7 | |
| 29 | 28 | 14 | 1 | 157 | 46 | 30 |
| 30 | 40 | 12 | 1 | 140 | 53 | 35 |
| 31 | 60 | 18 | 3 | 132 | 59 | 55 |
| 32 | 82 | 5 | 3 | 135 | 25 | |
| 33 | 40 | 7 | 3 | 131 | 52 | 45 |
| 34 | 25 | 7 | 3 | 125 | 56 | ≈30 |
| 35 | 131 | 11 | 3 | 135 | 27 | 65 |
| 36 | 90 | 10 | 3 | 120 | 27 | 45–50 |
| (3)37 | 30 | 14 | 3 | 120 | 56 | 35–40 |
| (3)38 | 37 | 15 | 3 | 120 | 56 | 40–42 |
| (3)39 | 30 | 13 | 3 | 120 | 56 | 32–35 |
| (3)40 | 40 | 23 | 3 | 117 | 56 | ≈50 |
| (3)41 | 40 | 19 | 2 | 133 | 54 | 42.5 |
| (3)42 | 40 | 20 | 2 | 120 | 54.5 | 45 |
| (3)43 | 60 | 14 | 2 | 123 | 28 | 45 |
| (2)(3)44 | 60 | 16 | 2 | 130 | 27 | 50 |
| (3)45 | 60 | 15 | 2 | 128 | 27.5 | 42.5 |
| 46 | 30 | 19 | 0.1 | 296 | 19.6 | |
| 47 | 70 | 13 | 0.1 | 332 | 20 | 32.5 |
| 48 | 120 | 10 | 0.2 | 314 | 17.5 | 37.5 |
| 49 | 120 | 4 | 0.5 | 246 | 19.6 | 40 |
| 50 | 105 | 6 | 0.5 | 247 | 21.4 | |
| (4)51 | 120 | 6 | 0.5 | 190 | 19.6 | |
| (4)52 | 23 | 8 | 0.25 | 200 | 34.2 | |
| (5)53 | 15 | 8 | 0.25 | 218 | 20 | 12.5 |
| (5)54 | 52 | 6 | 0.25 | 249 | 20 | 25 |
| 55 | 120 | 3 | 0.25 | 167 | 10 | |
| 56 | 180 | 3 | 0.25 | 155 | 10 | |
| (5)57 | 33 | 10 | 0.1 | 302 | 19.6 | 125 |
| 58 | 30 | 8 | 0.2 | 270 | 20 | 20 |
| (5)59 | 120 | 6 | 0.2 | 262 | 11.4 | 37.5 |
| (3)(5)60 | 60 | 4 | 0.2 | 300 | 20 | 25 |
| (3)(5)61 | 75 | 11 | 1 | 165 | 29.2 | 40–60 |
| (3)(5)62 | 90 | 10 | 1 | 167 | 19.3 | 42.5 |
| (5)63 | 37 | 7 | 0.2 | 250 | 20 | 20 |
| (5)64 | 120 | 8 | 0.2 | 257 | 20 | 32–37 |
| (5)65 | 94 | 10 | 0.2 | 267 | 20 | 25 |
| (2)(5)66 | 128 | 8 | 0.2 | 319 | 19.6 | 25 |
| (2)(5)67 | 167 | 4 | 0.2 | 330 | 14 | 27.5 |
| (5)68 | | | 1.5 | | | |
| (5)69 | 67 | 5 | 0.75 | 227 | 48 | 30.5 |
| (5)70 | 60 | 5 | 0.05 | 324 | 6 | |
| (5)71 | 60 | 8 | 0.75 | 323 | 15 | 15.2 |
| (5)72 | 120 | 8 | 0.1 | 320 | 17 | 20.3 |
| (5)73 | 60 | 8 | 0.1 | 316 | 17 | 17.8 |
| (5)74 | 60 | 7 | 0.1 | 322 | 15 | 15.2 |
| (2)(5)75 | 115 | 3 | 0.1 | 345 | 10 | 19 |
| (2)(5)76 | 120 | 7 | 0.25 | 263 | 20 | 27.9 |
| (5)77 | 60 | 5 | 0.25 | 163 | 40 | |
| (5)78 | 67 | 4 | 0.25 | 200 | 40 | 38.1 |
| (5)79 | 110 | 2 | 0.75 | 137 | 13 | 33 |
| (5)(6)80 | 60 | −10 | 0.02 | 395 | 60 | 50 |
| (5)(6)81 | 90 | −15 | 0.015 | 450 | 75 | 40 |
| (5)(6)82 | 120 | −25 | 0.01 | 500 | 90 | 55 |

(1) 50 mil construction grade aluminum.
(2) 5052 alloy.
(3) titanium potassium oxalate in bath.
(4) back side covered with aluminum foil.
(5) back side covered with masking tape.
(6) water-ethylene glycol media.

were transparent with a slight tint of gold color. As the thickness increased the films become less transparent and the gold coloring becomes deeper, with very thick films (60 microns) having brown coloring. The color is due to small traces of iron in the alloy and the bath. High voltage films (above 150 volts) had a grayish coloring.

In one aspect of the present invention, the anodized film of the prior art is treated to enlarge the pore area by bringing an etchant into contact with the pores along their entire extent while at the same time deferring the action of the etchant until it can be effective along the entire length of the pore so that the taper, if any, is not accentuated by the etching process once it starts.

After the anodizing was completed, the product was cut into smaller pieces for subsequent processing. A circle of the desired diameter was scribed through the anodized layer into the substrate by use of a stylus and template. The anodized sheet was cut into discs that were slightly larger than the scribed circle. These discs were immediately placed in a saturated aqueous solution of $HgCl_2$. The aluminum was slowly dissolved by the solution by reaction with $HgCl_2$ and by amalgamation with the resulting Hg until the circular film floated free. The floating film was removed with a spatula-like tool by raising it under the film and lifting it out of the solution. While on the tool the film was rinsed with water, then washed in a 5 percent nitric acid bath to remove any traces of mercury salts. Finally the film was washed several times in distilled water and placed on a Teflon slab to oven dry at 110° C for at least 1 hour.

The as-formed 10 micron thick channel plates were approximately 5 percent open and had length-to-diameter ratios of approximately 500. Preliminary tests showed that they were not useful as channel plates in this geometry. It was therefore necessary to etch open the channel plates to increase the open area and to reduce the length-to-diameter ratios for the pores.

It would appear that simple immersion of the channel plates in an etchant for $Al_2O_3$ should result in opening of the channels. Because of diffusion problems, such treatment did not appreciably increase the diameter of the channels in the interior of the channel plate and hence another technique for opening the channels had to be devised. It was found that the hole area could be increased to the desired extent by impregnating the channel plate with an etchant that is not reactive under the impregnation conditions. Then the channel plate was removed from the bath of etchant. The etchant was then activated by use of another chemical constituent that is not in itself an etchant but rather serves to catalyze the reaction between the etchant and the $Al_2O_3$ surface.

The pore enlarging etching was accomplished by placing the channel plate in a saturated solution of sodium hydroxide in ethyl alcohol for an hour in order to thoroughly impregnate and fill the pores. Other alkalies including KOH, LiOH, and even organic alkalies such as tetramethylammonium hydroxides or tetraphenylammonium hydroxide may be also utilized. The plate was then removed from the alcoholic solution and placed in distilled water. An immediate reaction took place as evidenced by vigorous bubble formation. The extent of etching was determined by a comparison of the channel plate density before and after etching, typical results being given in Table II and Table III. The etching process results in structures with open areas ranging from approximately 20 to 70 percent depending on conditions.

FIG. 2 is a schematic view showing the cross section of an anodic film after it has been detached from the unanodized base metal, and FIG. 3 shows the same film after it has been subjected to the pore-enlarging etching.

It will be seen that the barrier layer adjacent to and below the bottom of the pores has been removed, part of the removal having taken place while the plate was immersed in alcoholic caustic and the remainder having been removed during the subsequent immersion in water.

The "as produced" channel plates were found to have a bulk resistivity of approximately $2 \times 10^{16}$ ohm-cm. For practical application the channel plates should have output By the procedure described above, the pores in the originally anodized material have been enlarged from between 200A–500A to between 0.2 micron to 0.8 micron, the hole area in the layer has been increased from about 5 percent to 50 percent and in some cases as high as 70 percent, the length-to-diameter ratio has been reduced to about 50–200:1 and, when the higher voltages are utilized the center-to-center spacing of the pores to a range over 0.4 to 1.0 micron.

It will be seen that the etching procedure involves first contacting and filling the pores with an etchant which is carried in a solvent in which it is relatively inert and then is brought into contact with a liquid in

TABLE II.—CONTROLLED ETCHING

| Plate batch | Diameter (inch) | Weight (mgs.) Before etching | Weight (mgs.) After etching | Thickness ($\mu$) Before etching | Thickness ($\mu$) After etching | Density Before etching | Density After etching | Percent density change |
|---|---|---|---|---|---|---|---|---|
| 1 | 1 | 9.3 | 5.0 | 10.5 | 9.5 | 1.75 | 1.04 | 41 |
| 1 | 1 | 9.5 | 5.5 | 10.6 | 9.4 | 1.77 | 1.16 | 35 |
| 1 | 1 | 9.7 | 5.7 | 10.5 | 9.5 | 1.73 | 1.18 | 34 |
| 2 | 7/8 | 9.2 | 6.4 | 10.3 | 10.3 | 2.30 | 1.60 | 30 |
| 2 | 7/8 | 9.1 | 7.1 | 10.3 | 10.3 | 2.28 | 1.78 | 22 |
| 2 | 7/8 | 9.1 | 7.5 | 10.3 | 10.2 | 2.30 | 1.90 | 17 |
| 2 | 7/8 | 9.2 | 6.3 | 10.4 | 10.3 | 2.28 | 1.58 | 31 |
| 2 | 7/8 | 9.0 | 6.2 | 10.2 | 10.2 | 2.28 | 1.57 | 31 |
| 2 | 7/8 | 9.1 | 7.7 | 10.2 | 10.0 | 2.30 | 1.98 | 14 |
| 3 | 7/8 | 8.7 | 7.0 | 10.0 | 10.0 | 2.24 | 1.80 | 20 |
| 3 | 7/8 | 8.7 | 7.5 | 10.0 | 10.0 | 2.24 | 1.93 | 14 |

TABLE III.—CONTROLLED ETCHING—THICK PLATES

| Run | Anodizing voltage | Diameter (inch) | Weight (mgs.) Before etching | Weight (mgs.) After etching | Thickness ($\mu$) Before etching | Thickness ($\mu$) After etching | Density Before etching | Density After etching | Percent density change |
|---|---|---|---|---|---|---|---|---|---|
| 19 | 135 | 7/8 | 11.5 | 7.8 | 28.1 | 27.0 | 2.56 | 1.80 | 29.7 |
| 19 | | 7/8 | 11.2 | 7.9 | 28.0 | 27.0 | 2.50 | 1.83 | 26.8 |
| 20 | 136 | 7/8 | 16.9 | 7.7 | 41.0 | 39.0 | 2.57 | 1.24 | 51.7 |
| 20 | | 7/8 | 17.1 | 11.4 | 41.2 | 41.0 | 2.59 | 1.74 | 32.8 |
| 21 | 150 | 9/16 | 19.2 | 7.3 | 43.5 | 43.0 | 2.76 | 1.05 | 62.0 |
| 22 | 125 | 9/16 | 21.3 | 13.8 | 47.5 | 47.0 | 2.8 | 1.83 | 34.6 |
| 36 | 120 | 1 | 64.0 | 26.3 | 42.0 | 37.5 | 3.02 | 1.33 | 56.0 |
| 38 | 120 | 9/16 | 12.6 | 4.2 | 30.0 | 27.5 | 2.62 | 1.05 | 60.0 |
| 45 | 128 | 19/32 | 18.7 | 8.3 | 45.7 | 40.6 | 2.29 | 1.42 | 38.0 |
| 54 | 249 | 19/32 | 10.1 | 2.7 | 25.0 | 15.0 | 2.26 | 0.95 | 58.0 |
| 63 | 250 | 19/32 | 22.2 | 10.8 | 42.5 | 40.0 | 2.42 | 1.50 | 48.8 |
| 64 | 250 | 19/32 | 16.5 | 7.2 | 37.5 | 27.5 | 2.46 | 1.46 | 40.5 |
| 66 | 319 | 19/32 | 11.7 | 5.1 | 25.0 | 20.0 | 2.62 | 1.42 | 45.8 |
| 66 | 319 | 19/32 | 13.3 | 6.6 | 25.0 | 22.5 | 2.97 | 1.64 | 44.6 |
| 67 | 330 | 19/32 | 13.4 | 7.4 | 25.0 | 22.5 | 2.99 | 1.84 | 38.5 |
| 69 | 220 | 19/32 | 16.6 | 9.5 | 30.5 | 30.5 | 3.84 | 1.74 | 43.0 |
| 71 | 323 | 19/32 | 7.5 | 2.8 | 15.2 | 12.7 | 2.76 | 1.23 | 55.5 |
| 72 | 320 | 19/32 | 11.8 | 7.3 | 20.3 | 12.8 | 3.25 | 2.48 | 23.6 |
| 73 | 316 | 19/32 | 10.8 | 2.5 | 17.8 | 12.7 | 3.07 | 1.10 | 64.0 |
| 76 | 260 | 19/32 | 13.8 | 3.5 | 27.9 | 22.9 | 2.77 | 0.85 | 69.0 |
| 78 | 200 | 19/32 | 17.1 | 8.7 | 35.6 | 33.0 | 2.68 | 1.47 | 45.0 | currents near $10^{-7}$ amps. The strip current, determining the upper limit of the output current, must therefore lie in the region of $10^{-7}$ amps which corresponds to a bulk resistivity of approximately $2 \times 10^{12}$ ohm-cm at 1,000 volts.

It was found that heating the plates in hydrogen at 600° C for about 1 hour increased substantially the number of plates having strip currents of the desired magnitude. No noticeable reduction appeared to take place below 600° C. After 45 minutes at 600° C, significant reduction had occurred with better results being obtained after 1 hour. Plates so treated for 2 hours were generally too conductive. However, it was possible to reoxidize these plates by exposure to air at 600° C for 30 minutes.

Temperatures between about 550° C and 700° C can be used for this step provided the time of treatment is adjusted, higher temperatures requiring shorter times and conversely.

After plates with satisfactory electrical properties had been made, electrodes were attached to the same in the usual way to complete the channel plate.

which the etchant actively etches the pores. The etchant should be at least as strong as caustic. The preferred etchant is alcoholic caustic, later activated by addition of water.

The channel plates which were prepared by anodizing at from 400–500 volts have channel diameters (after etching to 50 percent open area) on the order of 0.7 to 0.8 micron and range from 40 to 55 microns in thickness. These channel plates thus have ratios of length-to-diameter from about 50:1 to 80:1. These channel plates have been operated for long time periods at voltages on the order of 2,000 volts. The electron multiplication factors vary from plate to plate but are generally on the order of 100 to 10,000 at 2,000 volts.

The electron multiplication factors at various operating voltages are enhanced by improving the secondary emissive properties of the channel plate. This may be accomplished by several different procedures. The first general procedure consists of incorporating metal ions such as magnesium, beryllium, titanium, manganese, boron, vanadium, silver, zinc, and the like into the anodic structure. This may be accomplished by utilizing suitable alloys of these metals as the anodizing substrate. The anodized film will then consist in part of these metal oxides interpersed in the aluminum oxide matrix. Alternatively appropriate salts of these metal ions may be added to the anodizing bath. They are then incorporated into the films during the anodizing process.

The second procedure involves coating the channel walls of completely fabricated channel plates with appropriate secondary emitters. This may be accomplished by placing the channel plates in solutions of appropriate metal salts such as the salts of the alkaline and alkaline earth metals, magnesium, beryllium or barium salts and then firing the channel plate at elevated temperatures. Alternatively the channel coating may be introduced by vacuum evaporation or by decomposition in situ of appropriate volatile metal compounds followed by firing at elevated temperatures.

These channel plates with enhanced secondary emission exhibit electron multiplication factors ranging from 100 to 10,000 at voltages on the order of 500–1,000 volts. At 2,000 volts the electron multiplication factors are all well in excess of $10^4$.

We claim:

1. Process of fabricating a channel plate which comprises:
 a. anodizing a metal surface of an anodizable metal,
 b. physically detaching the resulting anodized surface layer from the metal on which it is supported,
 c. impregnating the pores of said layer with an alcoholic solution of an alkali metal hydroxide,
 d. immersing the impregnated layer in water whereby an aqueous solution of impregnant forms in the pores and enlarges the same, and
 e. improving on the basic secondary emissive properties of the structure by doping with additional metal oxides or other secondary emittors,
 f. attaching electrodes to the resulting product.

2. The process of claim 1 wherein the impregnant is a solution of at least one alkali metal hydroxide in an alcohol selected from the group represented by the formula R-OH where R represents lower alkyl.

3. The process of claim 1 wherein the anodizable metal is aluminum and the anodizing is effected at voltages in excess of 200 volts whereby the center-to-center spacing between pores in the resulting anodized layer is increased to above 0.4 micron.

4. The process of claim 3 wherein the voltage is in the range of 250 to 500 volts.

5. Process of claim 1 wherein the plate is rinsed after step (e) and then subjected to heat treatment in hydrogen at about 600° C for about 1 hour to increase the electrical conductivity of the channel plate.

6. Process of claim 1 wherein the pores in the plate are doped with a reducible metal oxide during the anodizing process.

7. Process of claim 1 wherein the anodizable metal is selected from the group consisting of aluminum and aluminum-base alloys.

8. A process according to claim 7 in which the aluminum alloy is an alloy of aluminum with at least one metal such as Mg, Be, Ti, B, Mn, V, Ag and Zn so that the resulting channel plate exhibits enhanced secondary emissive properties.

9. A process according to claim 1 in which the pores in the plate are doped with salts of metals which are secondary emitters.

10. A process according to claim 9 in which the salts are salts of the alkaline and alkaline earth metals.

11. The process of claim 10 in which the salts are acetates.

* * * * *